United States Patent Office 3,538,162
Patented Nov. 3, 1970

3,538,162
REDUCTIVE ALKYLATION OF AROMATIC AMINO AND NITRO COMPOUNDS UTILIZING BASE METAL SELENIDES AND TELLURIDES AS CATALYSTS
Frederick S. Dovell, Naugatuck, Conn., assignor to Uniroyal, Inc., New York, N.Y., a corporation of New Jersey
No Drawing. Filed Oct. 20, 1967, Ser. No. 676,690
Int. Cl. C07c 85/08, 85/12
U.S. Cl. 260—576                6 Claims

ABSTRACT OF THE DISCLOSURE

Aromatic compounds having an amino or a nitro group are reductively alkylated with a ketone in the presence of a selenide or telluride of cobalt, nickel, molybdenum, or rhenium catalyst.

---

This invention relates to the use of base metal selenides and tellurides as catalysts for the reductive alkylation of aromatic amines with ketones.

It has been discovered that base metal selenides and tellurides catalyze the reductive alkylation with a high degree of selectivity and without the occurrence of side reactions such as hydrogenation of the aromatic ring, cleavage by hydrogenolysis of the carbon-nitrogen linkage, and the reduction of the ketone to the corresponding alcohol. Additionally, the base metal selenides and tellurides are insensitive to poisons, such as sulfur, and therefore can be used with impure feedstocks and for long periods without the necessity of regeneration.

Included in the base metal selenides and tellurides of the invention are those of cobalt, nickel, molybdenum and rhenium. These metal catalysts can be prepared by several methods obvious to those skilled in the art of catalyst preparation. They may be prepared either in situ or added to the hydrogenation reaction mixture after prior preparation and isolation. Further, the catalyst may be prepared and used as a bulk powder or supported on a suitable carrier, such as carbon or alumina; and whether supported or not, may be prepared and used as a powder for liquid phase slurry and for vapor phase fluidized reactions, or as a pellet for liquid or vapor phase fixed bed operations. From .0001 to 0.5 part by weight, preferably from .005 to 0.25 of catalyst is employed based on a unit weight of reactant charge for slurry reactions. In fixed bed processes the amount of catalyst to give a weight hourly space velocity (WHSV) of from 0.01 to 50, preferably from 0.1 to 25, is used.

The reaction temperature should be within the range of from about 100° C. to 300, preferably from 150 to 250, and the pressure from about 10 atmospheres up to 1,000 atmospheres or as high as is practical. The higher pressures favor the reaction rate, but are not necessary. The exact conditions will depend, of course, on the nature of the reductive alkylation reaction being carried out, and the optimum economic combination of temperature, pressure, catalyst level and cycle time. The range of practical catalyst levels will become apparent from the examples given below.

The reactions may be carried out in either batch or continuous systems, with either tank or pipe-line type reactors and in the liquid phase with slurry or fixed bed catalysts, or in the vapor phase with either fluidized or fixed bed catalysts, operating in a manner well known to those skilled in the art.

The primary organic amines of the invention may be of the alkyl or aryl type. They may be substituted with any inert functional group such as an alkyl, alkoxy, aryl, carboxyl ester, nitrile, halogen or hydroxyl. The corresponding nitro compound may also be reacted, in which case the nitro group is reduced to the amino group in situ prior to the reductive alkylation. Preferably, aromatic amines and nitro compounds are reductively alkylated. Examples of primary aromatic amines are aniline, toluidines, xylidines, o-, m-, or p-phenylenediamine, anisidines, benzylamine, N-phenyl-p-phenylenediamine, $\alpha$- or $\beta$-naphthylamine, the naphthylenediamines, haloamines as for example p-chloroaniline, or their precursors in which the nitrogen of the amine is present as the nitro group, as for example nitrobenzene and p-nitroaniline.

A variety of ketones may be employed. Preferably, alkyl ketones, cycloalkyl ketones and diketones are used. These compounds may have from 3 to 20 carbon atoms, most desirably, from 3 to 9. Examples are acetone, methylethyl ketone, methylisobutyl ketone, methyl isoamyl ketone, diethyl ketone, ethyl butyl ketone, 5-methyl heptanone-3, diisobutyl ketone, diheptyl ketone, diisodecyl ketone, 2,4-pentanedione, 2,5-hexanedione, cyclobutanone, cyclopentanone, cyclohexanone and cyclooctanone.

There must be at least one mol of ketone present per mol of amine. A large excess, up to 25 or more mols of ketone may be used. Generally, the molar ratio ranges from 1 to 25, preferably, from 1.2 to 8. Where only a slight excess of ketone is used, an additional inert solvent, such as heptane or toluene, may be used to maintain fluidity.

There must be at least one mol of hydrogen present when an amine is used; at least four mols when the nitro precursor is used. Generally a large excess of hydrogen is used to maintain the pressure. The exact molar excess is not important.

The catalysts of the invention may be prepared as follows:

EXAMPLE A

Twenty-five grams of aluminum powder and 44 grams of selenium powder were thoroughly mixed. About 3 grams of the mixture were placed in a clay crucible and ignited with a piece of burning magnesium ribbon. Successive portions of the mixed powder were added to the glowing mass in the crucible after each violent reaction had subsided somewhat. The entire procedure required approximately one-half hour. The cooled mass of aluminum selenide was crushed to a coarse powder and stored in a closed jar.

A portion of the aluminum selenide powder was placed in a simple gas generation apparatus consisting of a filter flask fitted with a dropping funnel and a gas exit. Water was allowed to drop slowly onto the aluminum selenide powder from the dropping funnel and the hydrogen selenide gas generated thereby was led through a glass wool filter to remove entrained free selenium and thence into a well stirred solution of 4.5 grams (0.01 mole) of rhenium heptoxide and 5 ml. of 6 N sodium hydroxide in 100 ml. of water. After about 1½ hrs. of slow passage of hydrogen selenide, the gas generation was stopped and the rhenium selenide solution was acidified to precipitate the black selenide which was collected by filtration, washed with water and dried. The yield was 8.0 grams.

EXAMPLE B

A solution of selenous acid was prepared by dissolving 1.58 grams (0.02 mole) of selenium in a mixture of 12 ml. of concentrated nitric acid and 6 ml. of water. To this solution was added a solution of 5.82 grams (0.02 mole) of nickel nitrate hexahydrate in 20 ml. of water. The resulting solution of nickel selenite was added slowly to a well-stirred boiling solution of 15 grams of hydroxylamine hydrochloride and 50 ml. of ammonium hydroxide in 150 ml. of water. Boiling and stirring were continued for 1½ hrs. when the slurry was cooled and the black solid collected by filtration, washed with water and dried. The yield was 1.4 grams.

EXAMPLE C

Hydrogen selenide gas was generated as described in Example A and conducted into a well stirred solution of 24.72 grams (0.02 mole) of commercial ammonium paramolybdate in 200 ml. of water. The thick black slurry which resulted after a reasonably short time was filtered and the solid material removed was washed with water and dried.

The yield was 4.6 grams.

EXAMPLE D

A solution was prepared by adding 80 ml. of ammonium hydroxide to a solution of 5.8 grams (0.02 mole) of cobalt nitrate hexahydrate in 300 ml. of water. This amount of ammonium hydroxide was just enough to redissolve the initial blue-white precipitate of cobalt hydroxide, forming, presumably, the cobalt ammonia complex.

Hydrogen selenide was generated as described in Exampe A and led into the well stirred solution of cobalt in ammonium hydroxide until precipitation of a black solid appeared to be complete. The solid was removed by filtration, washed with water and dried. The yield was 4.0 grams.

EXAMPLE E

In a manner analogous to Example A, aluminum telluride was prepared by the fusion of 30 g. of aluminum and 80 g. of tellurium powders.

Rhenium telluride was prepared from 4.8 g. of rhenium heptoxide by the same manner as described for the preparation of rhenium selenide. The yield was 0.4 g.

To illustrate more fully the instant invention attention is directed to the following examples:

EXAMPLE 1

To a 170 ml. stainless steel Magne-Dash autoclave was added 18.6 grams (0.20 mole) of aniline, 47 ml. (0.64 mole) of acetone and 0.65 gram (10 g./l.) of rhenium selenide prepared in Example A. The autoclave was sealed, purged first with nitrogen, then with hydrogen. Hydrogen was added to a pressure of 700 p.s.i.g. The autoclave was agitated and heated to 180° C., and held at this temperature while hydrogen was added as required to maintain a pressure of 700–900 p.s.i.g. After 1.3 hrs. the reaction had apparently ceased. The autoclave was cooled, depressurized and emptied. The contents were filtered to remove the catalyst. Gas-liquid chromatographic analysis of the filtrate showed essentially 100% conversion of aniline to N-isopropylaniline.

EXAMPLE 2

The 170 ml. autoclave was charged as described in Example 1, except using 0.65 gram (10 g./l.) of nickel selenide prepared in Example B as catalyst. The autoclave was purged, pressurized, heated and agitated as described in Example 1 to 190° C. and held at this temperature while hydrogen was admitted as required to maintain 700–900 p.s.i.g. After 6.8 hrs. the reaction ceased. The autoclave was cooled, depressurized and emptied. The filtrate obtained by filtering the contents was analyzed by gas-liquid chromatography and was found to consist of only N-isopropylaniline and a small amount of water in acetone. Thus there had been a 100% conversion of aniline to the desired product.

EXAMPLE 3

The 170 ml. Magne-Dash autoclave was charged as described in Example 1, except with 0.65 gram (10 g./l.) of molybdenum selenide prepared as described in Example C. The autoclave was sealed, purged, pressured, agitated and heated to 190° C. as described in the previous examples.

Hydrogen was added to maintain a presure of 700–900 p.s.i.g. The autoclave was cooled after 5 hrs., depressurized and emptied. The contents were filtered to remove catalyst and the filtrate analyzed by gas-liquid chormatographic analysis. It was found that there had been a 100% conversion of aniline to N-isopropylaniline.

EXAMPLE 4

The 170 ml. Magne-Dash autoclave was charged with 18.4 grams (0.10 mole) of N-phenyl-p-phenylenediamine, 46 ml. (0.62 mole) of acetone and 0.65 gram (10 g./l.) of cobalt selenide as prepared in Example D. The autoclave was closed, purged, pressured, heated and agitated as described above. After 4½ hrs. at 180° C. and 700–900 p.s.i.g. the autoclave was cooled, depressurized and emptied. The catalyst was removed by filtration and the filtrate separated by topping (removal of volatiles by distillation without rectification) into a distillate and a residue product up to a pot temperature of 160° C. at 55 mm. pressure. The residue weighing 22 grams was found by gas-liquid chromatography to consist of essentially 100% N-isopropyl-N′-phenyl-p-phenylenediamine. The volatiles removed were found by the same method to consist entirely of acetone and water. Thus there had been a 100% conversion of starting materal to desired products with no undesirable side reaction.

EXAMPLE 5

The 170 ml. Magne-Dash was charged as described in Example 1, except with 0.4 g. (6.15 g./l.) of rhenium telluride prepared in Example E. The autoclave was sealed, purged, pressured, agitated and heated to 180° C. as described in previous examples. Hydrogen was admitted to 900 p.s.i.g. Although a reaction was still taking place after 5¼ hrs., the reaction was stopped, the autoclave cooled, depressurized and emptied. The contents were filtered to remove catalyst. Analysis of the filtrate by gas-liquid chromatographic analysis indicated 15% of the aniline had been converted to N-isopropylaniline. The remainder of the filtrate consisted only of acetone, water and unreacted aniline.

EXAMPLE 6

The 170 ml. Magne-Dash autoclave was charged as described in Example 1 except with 0.3 g. (4.6 g./l.) of cobalt telluride prepared in the manner described in Example E (using cobalt nitrate in place of rhenium heptoxide and ammonium hydroxide in place of sodium hydroxide).

The autoclave was sealed, purged, pressured, agitated and heated to 180° C. Hydrogen was admitted to maintain a pressure of 700–900 p.s.i.g.

The autoclave was cooled after 10.2 hrs., depressurized and emptied. The contents were filtered to remove catalyst and the filtrate analyzed by gas-liquid chromatography. More than 97% of the aniline had been converted to N-isopropyl aniline, and the yield based on recovered aniline was near 100%.

EXAMPLE 7

The 170 ml. Magne-Dash autoclave was charged as described in Example 1, except with 0.65 g. (10 g./l.) of nickel telluride prepared in the manner described in Example E (using nickel nitrate in place of rhenium heptoxide and ammonium hydroxide in place of sodium hydroxide). The autoclave was sealed, purged, pressured, agitated and heated to 180° C. Hydrogen was admitted to maintain 700–850 p.s.i.g. After 11.5 hrs., although a reaction was still in progress, the autoclave was cooled, depressurized and emptied. The catalyst was removed by filtration. Analysis of the filtrate by gas-liquid chromatography showed at least 57% of the aniline had been converted to N-isopropylaniline.

Having thus described my invention, what I claim and desire to protect by Letters Patent is:

1. In a reductive alkylation process wherein an amino group of an aromatic amine is reacted with a ketone having from 3 to 20 carbon atoms, the improvement of carrying out said reaction in the presence of a catalytic amount of a selenide of cobalt, nickel, molybdenum, or rhenium or a telluride of cobalt, nickel or rhenium.

2. The process of claim 1 wherein the aromatic amine is aniline.

3. The process of claim 1 wherein the aromatic amine is N-phenyl-phenylenediamine.

4. The process of claim 1 wherein the aromatic amine is reacted with acetone.

5. The process of claim 1 wherein the aromatic amine is aniline and the ketone is acetone.

6. The process of claim 1 wherein the aromatic amine is N-phenyl-p-phenylenediamine and the ketone is acetone.

References Cited

UNITED STATES PATENTS

| | | | |
|---|---|---|---|
| 1,721,523 | 7/1929 | Midgley | 252—439 X |
| 1,991,096 | 2/1935 | Jackson | 252—439 X |
| 2,042,306 | 5/1936 | Haslam | 252—439 X |
| 2,161,066 | 6/1939 | La Lande | 252—439 X |
| 2,380,420 | 7/1945 | Emerson | 260—577 |

OTHER REFERENCES

Groggins: Unit Processes in Organic Synthesis, McGraw-Hill Book Company, Inc., New York, 1958, p. 175.

CHARLES B. PARKER, Primary Examiner

C. F. WARREN, Assistant Examiner

U.S. Cl. X.R.

252—439; 260—577, 689, 690